June 17, 1952  J. O. JACKSON  2,601,148
WIND TUNNEL WINDOW STRUCTURE
Filed Oct. 30, 1947  2 SHEETS—SHEET 1
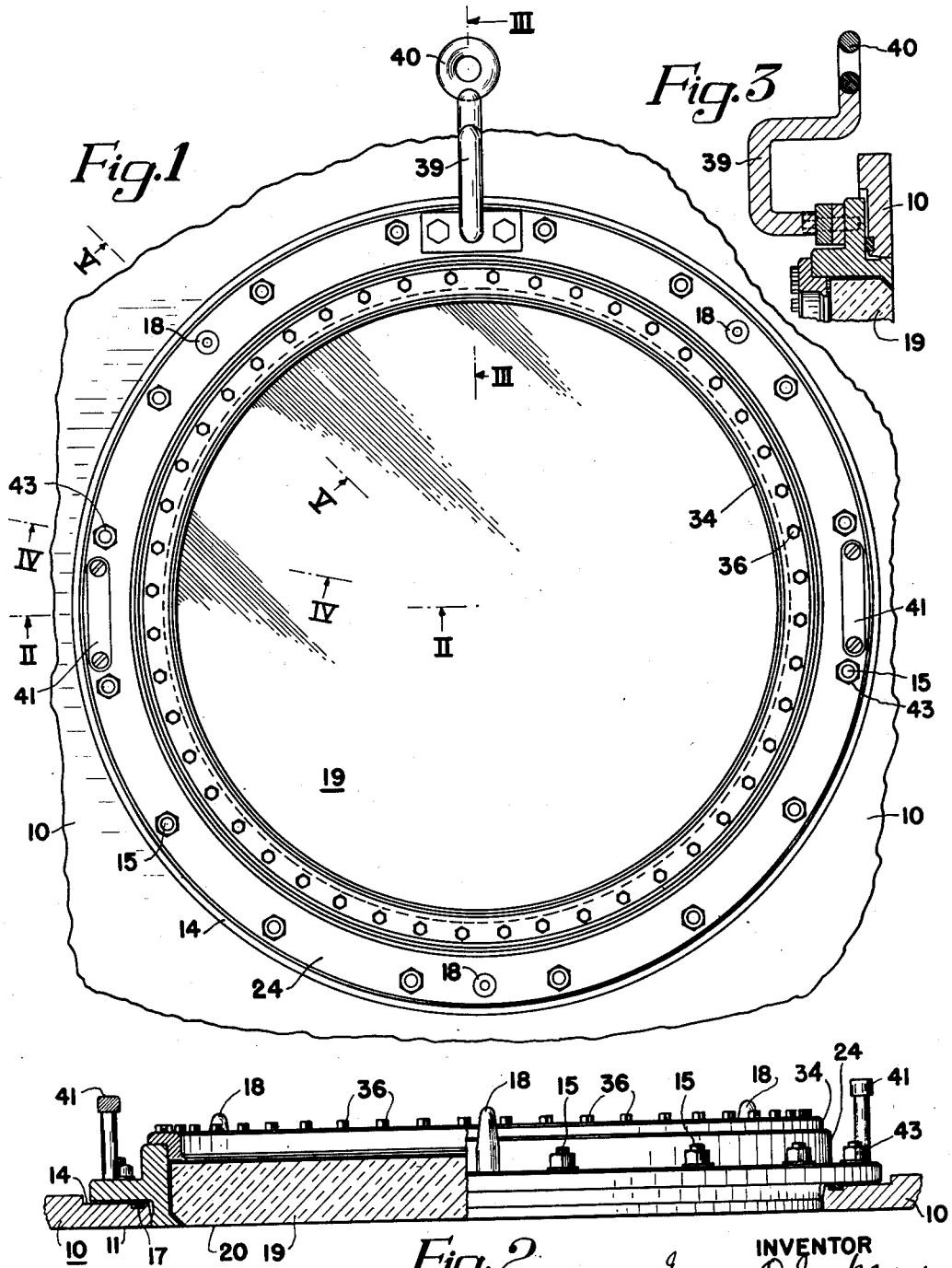
INVENTOR
James O. Jackson
BY Green, McCallister + Miller
His ATTORNEYS

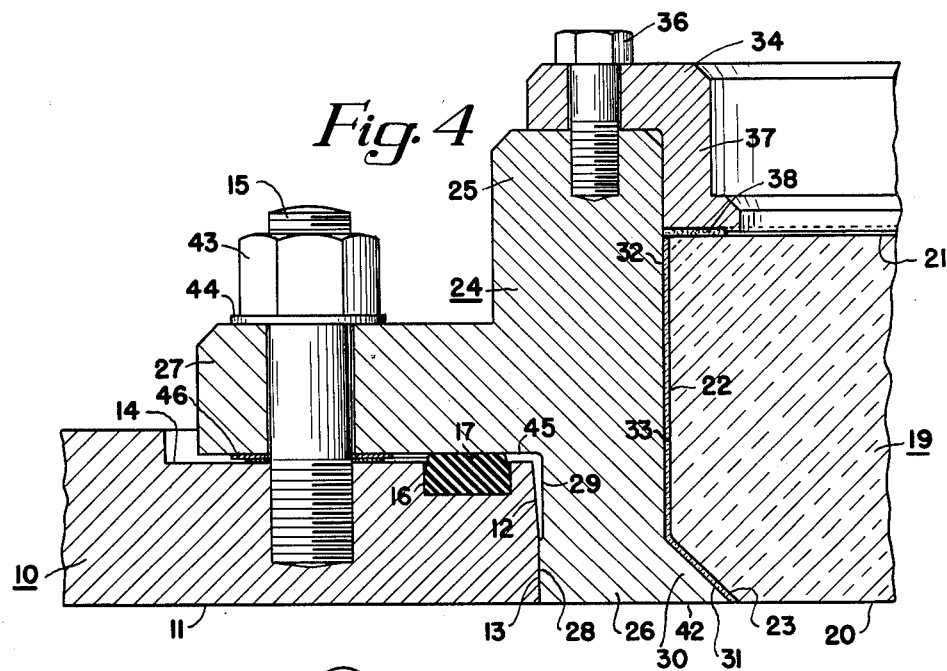
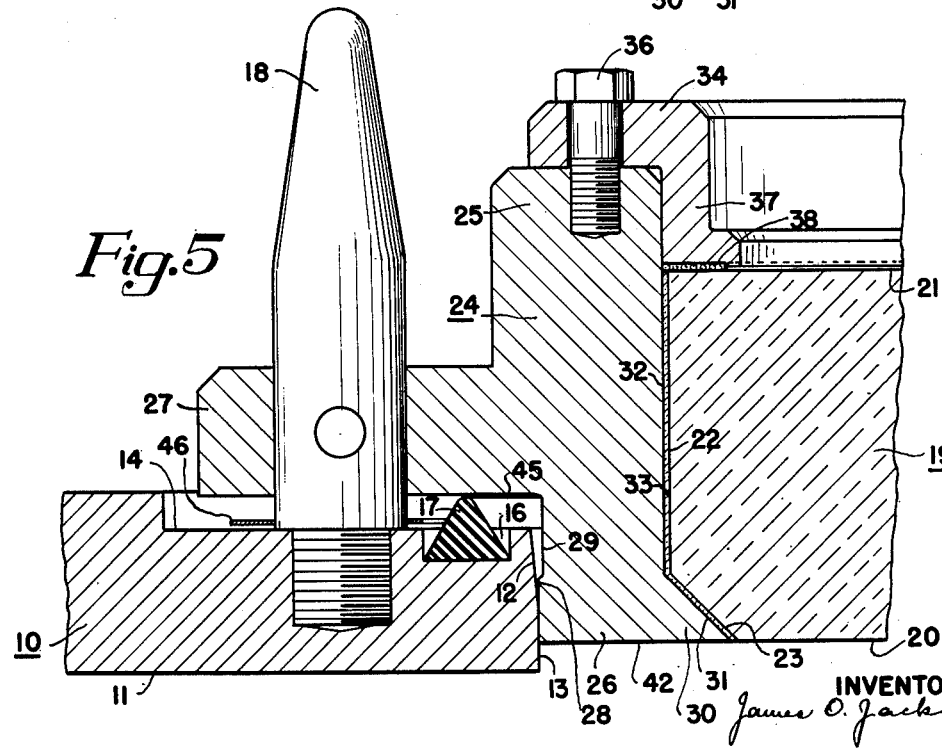

Patented June 17, 1952

2,601,148

UNITED STATES PATENT OFFICE 2,601,148

WIND TUNNEL WINDOW STRUCTURE

James O. Jackson, Crafton, Pa., assignor to Pittsburgh-Des Moines Company, a corporation of Pennsylvania Application October 30, 1947, Serial No. 783,158

14 Claims. (Cl. 20—40)

This invention relates to supersonic wind tunnels and more particularly to windows for such tunnels. These windows may be located within openings in any part of a wind tunnel where it is desired to observe flow phenomena, but are usually located in openings formed opposite one another in the test section side walls and in line with the position at which the test model is to be located.

Such windows must be removable, since they are not only used as windows through which to observe and photograph flow phenomena around a test model located in the fluid stream traversing the test section, but as a means of gaining access to the interior of the test section for the purpose of placing the test models in position within and removing them from such test section.

The inner faces of the side walls of the test section of such a tunnel extend in parallel vertical planes and are formed of metallic plates joined together in a fluid-tight manner. The inside surface of such walls in the test section is finished to close tolerances by machining operations such as planing and/or milling and then polished to a high degree of smoothness, the particular degree depending on the elastic fluid used in the tunnel and the speed with which such fluid is to flow through the test section of the tunnel.

The inner or tunnel face of both the window glass and the frame within which the glass is mounted, that is, the faces of the parts contacted by the fluid flowing through the test section, must be sufficiently flat and smooth and must so nearly approach the plane of the inner face of the test section side wall in which the window is mounted that any appreciable interference with the normal flow of such fluid around the test model is avoided.

One object of this invention is to produce a window structure for the test section of a supersonic wind tunnel that is so smooth on the side with which the fluid moving through the test section contacts that undesirable interference with the normal flow of such fluid around the test model is avoided.

Another object is to produce a wind tunnel window structure the inner face of which may be aligned with the inner surface of the test section wall to such a degree of precision that the fluid flow through the test section will not be affected.

A further object is to produce a wind tunnel test section window comprising a window glass and frame which may be readily removed for access to the model being tested and replaced without harmfully affecting the smoothness and perfection of fit between the window frame and the inner surface of the test section side wall.

These and other objects, I attain by means of the structure described in the specification and illustrated in the drawings accompanying and forming part of this application.

In the drawings:

Figure 1 is an outside view of a window embodying this invention secured in position within a window opening in a side wall of the test section of a wind tunnel;

Fig. 2 is a view partially in section and partially in end elevation of the window of Fig. 1, the sectioned part being taken on line II—II of Fig. 1;

Fig. 3 is a detailed sectional view of a portion of the window of Figs. 1 and 2 and is taken on line III—III of Fig. 1;

Fig. 4 is an enlarged fragmentary sectional view of a portion of the window and the tunnel side wall of Fig. 1 and is taken on line IV—IV of Fig. 1, the window being shown bolted in position; and Fig. 5 is an enlarged fragmentary sectional view taken on line V—V of Fig. 1. This view shows the window as it is being placed in or removed from position.

10 represents a portion of the side wall of the test section of a wind tunnel. Such wall is formed of a number of metal plates preferably butt welded together in fluid-tight relation and having an inner surface 11 which is finished to close tolerances by machining, such as by planing, milling or the like and then polished to a high degree of smoothness. Wall 10 is provided with a window opening which in this case is circular since the window disclosed herein is circular. The window may be of any shape and of course the window opening will be made to correspond to the shape of the window.

The window opening for a circular window as here employed may be first bored, then the outer half of the wall is relieved as at 12. The inner half 13 is accurately ground. The back of tunnel wall 10 surrounding the window opening is accurately machined as at 14 so that the plane of such surface parallels inner face 11 of the wall as closely as is possible.

Wall 10 is drilled and tapped to receive a circular row of equally spaced stud bolts 15; the bolt circle being concentric with the circular edge of the window wall. Machined face 14 at the outside side of wall 10 is provided with an annular groove 16 which is preferably rectangular in cross section. A resilient packing member 17, which, when uncompressed is generally triangular in cross section as shown in Fig. 5, is located within such groove and has its base secured to the bottom wall of such groove.

The axes of stud bolts 15 parallel the axis of the cylinder defined by wall portion 13 of the window opening and are therefore perpendicular to the planes defined by inner surface 11 of wall 10 and the machined portion 14 of the outer surface of such wall.

In the circle defined by the axes of stud bolts 15, preferably three holes are drilled and tapped in wall 10 to receive three pilot pins 18. The axes of the pilot pins when connected by straight lines, define an isosceles triangle having its base adjacent the top of the window and its apex at the lower center of the window frame.

The pilot pins extend outwardly beyond the outer side of wall 10 approximately twice as far as stud bolts 15. These pilot pins throughout a considerable part of their length are tapered as shown in Fig. 5.

*The window*

The window of this invention comprises a relatively thick glass, a frame within which the glass is mounted and to which it is bonded by transparent cement and a retainer for preventing movement of the glass because of pressures encountered during operation of the tunnel.

Glass 19 of the window in the example chosen for illustrating this invention is 28.5" in diameter and 2.85" thick. The inner and outer faces numbered 20 and 21 respectively are optically ground and polished until the combined error at any place in such faces is no greater than one wave length of sodium light which is about .000009". The major part of the outer edge 22 of the glass is rough ground and is perpendicular to faces 20 and 21. The inner corner is angled or beveled as disclosed at 23. This portion is also rough ground.

*Window frame*

The window frame is a unitary or one-piece structure and comprises a main part 24, having an outer portion 25 and an inner portion 26. An outwardly extending circular flange 27 joins the main portion between the outer and inner portions 25 and 26. Inner portion 26 is provided with a cylindrical wall 28 which has a push fit with wall 13 of the window opening. Portion 26 above cylindrical wall 28 is cut away or relieved as shown at 29. Flange 27 is drilled to receive studs 15 and pilot pins 18.

Portion 26 opposite cylindrical wall 28 is provided with a flange 30 which has an angled face 31 corresponding to angled face 23 of glass 19. Inner face or wall 32, which extends from flange 30 to the outer end of portion 25, is so machined that it parallels cylindrical wall 28. The diameter of the opening surrounded by wall 32 is about $\frac{1}{16}$" greater than the diameter of window glass 19 so as to leave a space of about $\frac{1}{32}$" between the peripheral edges of glass 19 and faces or walls 31 and 32 of the window opening.

As above pointed out, glass 19 is bonded to the window frame by transparent cement, which in the drawings is numbered 33.

A retainer ring 34 secured to the outer end of portion 25 by a circular row of cap screws 36 is formed with a cylindrical leg 37 which has a sliding fit with wall 32. A non-metallic annular washer-like member 38 preferably formed of hard fibre is interposed between the inner face of cylindrical leg 37 and the outer face 21 of glass 19. The thickness of washer 38 is such that when the cap screws 36 are tightened, the pressure exerted against face 21 of the glass will be such as to prevent any movement of the glass during pressure changes which occur within the wind tunnel test section during operation of the tunnel. While the pressure exerted by cap screws 36 must be sufficient to prevent such movement, it must not be great enough to cause failure of the cement bond between the glass and the window frame.

Because of the weight of the window and the close fit between the window frame and the wall of the window opening, the window while being placed in and removed from position is preferably supported by an overhead crane. In order to attach the crane hook to the window, the window frame at its top center is provided with a generally U-shaped member 39 (Fig. 3) having a ring 40 formed as a part thereof for engagement with the crane hook. In order to hold the window in vertical position, ring 40 is located in the vertical plane which includes the center of mass of the window. The window frame at opposite sides is provided with handles 41 by means of which the window can be manipulated and guided into position on pilot pins 18.

The cylindrical portion of the pilot pins has a snug fit within the holes formed for their reception in flange 27 of the window frame while the holes for receiving stud bolts 15 are about $\frac{1}{32}$" larger in diameter than such stud bolts. The unequal spacing of the pilot pins insures that the same stud bolts will enter the same holes in flange 27 each time the window is replaced after having been removed.

Face 42 of the window frame is first ground smooth and after such grinding, it will probably not be closer to a true flat surface than from ½ to 1½ thousandths of an inch. After such grinding, face 42 is lapped against a surface plate using progressively finer abrasives until it is flat within from 10 to 30 millionths of an inch.

After face 42 of the window frame is thus finished, the following procedure is followed in mounting glass 19 within the window frame. A thin sheet of aluminum foil is first spread evenly over the surface of a surface plate or table having the desired degree of flatness. The window frame with glass 19 therein is lowered carefully onto the aluminum foil, making certain that no dust particles are trapped either between the surface 22 of the frame, surface 20 of glass 19 and the aluminum foil or between the aluminum foil and the surface plate. Glass 19 is then adjusted within the frame so that the space surrounding the glass within the frame is uniform.

The glass and frame are then weighted to insure close contact between them and the foil on the surface plate. Polymerizing cement is then poured and worked into the space between the glass and the window frame; care being taken to work out all air bubbles appearing in such cement. This can be done with a piece of wire. I have found that a cement sold by Eastman Kodak Company under the designation H. E. No. 2 is satisfactory. This cement I believe is butyl methacrylate monomer containing a polymerizing catalyst.

After this space has been completely filled with bubble-free cement, the assembly is gently warmed with heat lamps to accelerate polymerization of the cement. When polymerization is complete, fibre washer 38 is placed in position on face 21 of glass 19 and retainer ring 34 is secured in position by means of cap screws 36. The window is then removed from the surface plate with the aluminum foil adhering thereto, and inverted. The aluminum foil is then shaved from the joint between the glass 19 and surface 42 of the window frame by means of a safety razor blade held flat across such joint.

*Mounting the window*

The window is next placed in position on stud bolts 15 and bolted tightly to tunnel wall 10 by means of nuts 43 which are threaded to the outer ends of such stud bolts; washers 44 being interposed between such nuts and the inner face of flange 27.

Having accurately aligned outer face 20 of glass 19 with face 42 of the window frame, it becomes necessary to align these surfaces or faces with face 11 of wall 10 of the test section side wall. This is difficult to accomplish by machining alone, but I have found that sufficiently accurate alignment can be obtained by removing enough from the outer side of side wall 10 to make the thickness of such side wall from surface 14 to inner surface 11 about .040" less than the distance from face 42 of the window frame to inner face 45 of flange 27.

After the window frame is inserted and bolted in position so that inner face 45 of the flange 27 contacts face 14 of the cut-away portion of the side wall, face 42 of the window frame will project beyond face 11 about .040".

The actual projection adjacent each stud is next measured by means of a dial gauge flatness comparator which indicates the actual offset in multiples of .0001" to a precision of .0001". A circular brass ring 46 is provided for final assembly between flange 27 of the window frame and surface 14 of the tunnel side wall. This brass ring in this example has a thickness of .035".

After measurements are made by means of the flatness comparator, shims are machined to the exact thickness required or are assembled from stock of various thickness so that their aggregate thickness plus the thickness of such brass ring will be sufficient to bring surfaces 42 and 20 of the frame and glass respectively into sufficiently accurate alignment with inner face 11 of the test section side wall. These shims are annular and are placed over studs 15. After the required shims have been assembled on the studs, brass ring 46 is placed on top of the shims; this brass ring having openings through which the studs pass.

After the window has been thus shimmed, it may be removed leaving the circular brass ring in place which in turn prevents loss or rearrangement of any of the individual shims. The window may, therefore, be removed and replaced without affecting the fit on the inside of the tunnel wall when the stud bolts are tightened.

The volume of material in triangular gasket 17 is such, with relation to the volumetric capacity of groove 16, that when flange 27 is bolted tight against the brass ring and shim assembly, gasket 17 nearly fills but does not overfill groove 16. The gasket, therefore, will not affect the fit of the window frame nor the alignment of surfaces 11, 42 and 20.

By using my construction as above described, I have been able to obtain alignment of surfaces 11, 42 and 20, which are in contact with the fluid stream with such a degree of precision that the offsets if any are not measurable with precision dial gauge and micrometer equipment.

What I claim is:

1. The combination with a wind tunnel wall provided with an opening and a flat smooth inner surface surrounding such opening, of means for closing such opening; such means comprising a relatively thick glass having its inner and outer faces located in parallel planes and a frame surrounding such glass and to which the same is secured; such frame having a glass surrounding portion adapted to project into such wall opening beyond the inner surface of such tunnel wall and having its tunnel-side face flat and located in the same plane as the inner or tunnel-side face of such glass, means for adjusting such frame to bring the tunnel-side face of that portion thereof projecting into such wall opening into the plane of the inner face of the tunnel wall immediately surrounding such opening, and means for removably securing such frame in adjusted position.

2. The combination with a wind tunnel wall provided with a circular opening and having a flat, smooth inner surface surrounding such opening, of means for closing such opening; such means comprising a relatively thick glass having its inner and outer faces located in parallel planes and a frame surrounding such glass and to which the same is secured; such frame having an annular glass surrounding portion adapted to project into and through such opening a distance beyond the inner surface of such tunnel wall and having its tunnel-side face flat and located in the same plane as the inner or tunnel-side face of such glass, means for adjusting such frame to bring the tunnel-side face of that portion thereof located within such wall opening into the plane of the inner surface of the tunnel wall immediately surrounding such opening, and means for removably securing such frame in adjusted position.

3. The combination with a wall of a wind tunnel provided with a circular opening and a flat, smooth inner surface surrounding such opening, of removable means for closing such opening; such means comprising a relatively thick circular glass having its inner and outer faces located in parallel planes, the major part of its edge lying normal to such planes and having an angled corner at its inner edge, and a unitary frame surrounding such glass, and adapted to project into such opening beyond the plane of the inner face of the surrounding tunnel wall and away from such plane to a point beyond the outer face of such glass and having a surrounding flange between its inner and outer ends, a circular series of studs secured to such tunnel wall and passing through openings in such flange, means for adjusting such frame to bring the tunnel-side face of that portion thereof projecting into such opening into the plane of the inner face of the tunnel wall immediately surrounding such opening, and means for removably securing such frame in adjusted position.

4. The combination with a wall of a wind tunnel provided with a circular opening and a flat, smooth inner surface surrounding such opening, of removable means for closing such opening; such means comprising a relatively thick circular glass having its inner and outer faces located in parallel planes, the major part of its edge lying normal to such planes and having an angled corner at its inner edge, and a unitary frame surrounding such glass and adapted to project into such opening beyond the plane of the inner face of the surrounding tunnel wall and away from such plane to a point beyond the outer face of such glass and having a surrounding flange between its inner and outer ends, a circular series of studs secured to such tunnel wall and passing through openings in such flange, a packing between such studs and the wall of such opening, and means for adjusting such frame to bring the tunnel-side face of that portion thereof projecting into such opening into the plane of the inner face of the tunnel wall immediately surrounding such opening, and means for removably securing such frame in adjusted position.

5. The combination with a wind tunnel wall provided with an opening and having a flat, smooth inner surface surrounding such opening, of means for closing such opening; such means comprising a relatively thick glass having its inner and outer faces located in parallel planes and a frame surrounding such glass; such frame having a glass surrounding portion adapted to project into and through such opening a distance beyond the inner surface of such tunnel wall and having its tunnel-side face flat and smooth and located in the same plane as the inner face of such glass, a layer of transparent cement bonding such glass to such frame, means for adjusting such frame to bring the tunnel-side face of that portion thereof within such opening into the plane of the inner surface of the tunnel wall immediately surrounding such opening, and stud bolts secured to such tunnel wall for removably securing such frame in adjusted position.

6. The combination with a wind tunnel wall provided with an opening and a flat smooth inner surface surrounding such opening, of means for closing such opening; such means comprising a relatively thick glass having its inner and outer faces located in parallel planes and a unitary or one-piece frame surrounding such glass; such frame having a glass surrounding portion adapted to project into such opening and having its tunnel-side face flat, smooth and located in the same plane as the inner face of such glass, means bonding the edges of such glass to such frame, means for adjusting such frame to bring the tunnel-side face of that portion thereof projecting into such opening into the plane of the inner face of the tunnel wall immediately surrounding such opening, and means for removably securing such frame in adjusted position.

7. The combination with a wind tunnel side wall provided with an opening and a flat smooth inner surface surrounding such opening, of means for closing such opening; such means comprising a relatively thick glass having its inner and outer faces located in parallel planes and a frame surrounding such glass; such frame having a glass surrounding portion adapted to project into such opening and having its tunnel-side face flat and located in the same plane as the inner face of such glass, means bonding such glass to such frame, glass retainer means secured to such frame and overlying a marginal portion of the outer face of such glass, a non-metallic gasket interposed between such retainer and such outer face, means for adjusting such frame to bring the tunnel-side face of that portion thereof projecting into such opening into the plane of the inner face of the tunnel wall immediately surrounding such opening, and means for removably securing such frame in adjusted position.

8. The combination with a wind tunnel side wall provided with a circular opening and having a flat smooth inner surface surrounding such opening, of means for closing such opening; such means comprising a relatively thick circular glass having its inner and outer faces located in parallel planes, the major part of its edge lying normal to such planes and having an angled corner at its inner edge, and a frame for such glass; such frame having an annular glass surrounding portion adapted to project into such opening and having its tunnel-side face flat and located in the same plane as the inner face of such glass, means bonding such glass to such annular frame portion, glass retainer means secured to the outer end of such annular frame portion and overlying a marginal portion of the outer face of such glass, a non-metallic gasket interposed between such retainer and such outer face, means for adjusting such frame to bring the tunnel-side face of that portion thereof projecting into such opening into the plane of the inner face of the tunnel wall immediately surrounding such opening, and means for removably securing such frame in adjusted position.

9. The combination with a wind tunnel wall provided with a circular opening and having a flat smooth inner surface surrounding such opening, of means for closing such opening; such means comprising a relatively thick glass having its inner and outer faces located in parallel planes, the major part of its edge normal to such planes and having an angled corner at its inner edge, and a one-piece frame having an annular portion surrounding such glass and extending into such opening; such frame having its glass surrounding wall paralleling the edge and angled corner of such glass and its tunnel-side end flat and located in the same plane as the inner face of such glass, a layer of cement bonding such glass to such frame, means supplementing such cement and comprising an annular non-metallic member bearing on the outer face of such glass opposite such angled corner, a retainer secured to the outer end of such frame and bearing on such annular non-metallic member, means for adjusting such frame to bring the tunnel-side end of that portion thereof extending into such opening into the plane of the inner face of the tunnel wall immediately surrounding such opening, and means for removably securing such frame in adjusted position.

10. A structure as defined in claim 3, in combination with an annular gasket located between such circular series of studs and such circular opening and bearing on the tunnel wall and the tunnel-side face of the flange portion of the frame for sealing the joint between the frame and the tunnel wall.

11. In a method of making a closure structure for a window opening in a wall of a fluid duct or tunnel; such closure structure comprising a relatively thick glass and a frame surrounding such glass, to which such glass is to be bonded and in which the fluid duct-sides of such glass and frame must lie in the same plane; the steps which comprise, removing dust particles from the upper surface of a surface plate which is somewhat larger than the largest dimension of such frame, laying on such plate foil-like material having its surface-plate face free from dust, removing dust particles from the exposed face of such foil-like material, lowering such frame into contact with such foil-like material frame with the tunnel-side face thereof contacting such foil-like material, removing dust from at least the tunnel-side of such glass and then lowering the glass into such position within such frame as to provide a substantially uniform opening between the outside edge of such glass and the inside edge of such frame; placing a weight on such glass and such frame sufficient to assure contact between such glass and frame and such foil-like material, filling the space between such glass and frame with liquid bonding material, hardening such bonding material, and then removing the foil-like material adhering to the tunnel side face of such closure structure.

12. In a method of making a closure structure for a window opening in a wall of a wind tunnel; such closure comprising a relatively thick glass and a frame surrounding such glass, to which such glass is bonded and in which the wind-tunnel sides of such glass and frame must lie in the same plane; the steps which comprise removing dust particles from the upper surface of a surface plate, laying foil-like material on such surface plate, lowering such frame into contact with such foil-like material with the tunnel-side face thereof contacting such material, lowering such glass into such position within such frame as to provide a substantially uniform opening between the outside edge of such glass and the inside edge of such frame, holding such glass and frame in contact with such foil-like material, filling the space between such glass and frame with liquid bonding material, hardening such bonding material and removing the foil-like material adhering to the tunnel-side face of such closure structure.

13. In a method of making a closure structure for a window opening in a wall of a fluid duct or tunnel, such closure structure comprising a relatively thick glass and a frame surrounding such glass, to which such glass is bonded and in which the fluid duct or tunnel-sides of such glass and frame must lie in the same plane; the steps which comprise removing dust particles from the upper surface of a surface plate, laying on such plate foil-like material, removing dust particles from the exposed face of such foil-like material, lowering such frame into contact with such foil-like material with the tunnel-side face thereof contacting such material, removing dust particles from such glass and lowering the same into position within such frame and into contact with such foil-like material, filling the space between such glass and frame with liquid bonding material, hardening such bonding material and then removing the foil-like material adhering to the tunnel-side face of such closure structure.

14. A structure as defined in claim 1, in which the means for removably securing the frame in adjusted position comprises a circular row of stud bolts threaded into tapped holes in the tunnel wall around the wall opening and which pass through holes provided for their reception in the frame, and nuts which are threaded onto the outer ends of such stud bolts; and in which the means for adjusting the frame to bring the tunnel-side face of that portion thereof projecting into such wall opening into the plane of the inner face of the tunnel wall immediately surrounding such opening comprises at least one annular metallic washer surrounding each of such stud bolts and a metal ring which has openings therein for each such stud bolt and which retains such washers in place when the window frame is removed.

JAMES O. JACKSON.

REFERENCES CITED

The following references are of record in the file of this patent:

UNITED STATES PATENTS

| Number | Name | Date |
| --- | --- | --- |
| 38,342 | Sutton et al. | Apr. 28, 1863 |
| 412,751 | Henderson | Oct. 15, 1889 |
| 979,772 | Lawler | Dec. 27, 1910 |
| 1,025,688 | Crittall | May 7, 1912 |
| 1,433,166 | Wolff | Oct. 24, 1922 |
| 1,961,584 | Hathorn | June 5, 1934 |
| 1,995,939 | Osten | Mar. 26, 1935 |

FOREIGN PATENTS

| Number | Country | Date |
| --- | --- | --- |
| 2,850 | Great Britain | 1915 |